United States Patent [19]

Rittler

[11] Patent Number: 4,772,577

[45] Date of Patent: Sep. 20, 1988

[54] METAL COATED PHYLLOSILICATE AND METHOD

[75] Inventor: Hermann L. Rittler, Corning, N.Y.

[73] Assignee: Corning Glass Works, Corning, N.Y.

[21] Appl. No.: 91,443

[22] Filed: Aug. 31, 1987

[51] Int. Cl.$^4$ .................... C04B 33/00; C04B 33/02

[52] U.S. Cl. .................... 501/145; 501/150; 428/363; 428/404; 428/454; 252/378 R

[58] Field of Search ............... 501/145, 150; 428/363, 428/404, 454; 252/378 R; 106/DIG. 3

[56] References Cited

U.S. PATENT DOCUMENTS 4,497,869  2/1985  Kamigaito et al. ............. 252/378 R Primary Examiner—William R. Dixon, Jr.
Assistant Examiner—David M. Brunsman
Attorney, Agent, or Firm—Clinton S. Janes, Jr.

[57] ABSTRACT

There is disclosed a delaminated phyllosilicate particle of less than 1000 Å thickness and having a coating of a transition metal on its surface, the metal being selected from the transition elements and groups 3a, 4a, 5a and 6a of the Periodic Table. Also disclosed is a method of producing such particle by an ion exchange treatment coupled with a reactive vapor phase/thermal treatment. A ceramic-metal composite composed of such metal coated particles compressed in a solid body is also disclosed.

18 Claims, No Drawings

METAL COATED PHYLLOSILICATE AND METHOD

RELATED APPLICATION

An application, filed of even date herewith in my name and entitled "Stabilized Phyllosilicate and Method," describes a novel delaminating procedure wherein a phyllosilicate is exposed to a reactive vapor phase in, or constituting, a non-oxidizing atmosphere during a delaminating thermal treatment. Analyses indicate that the vapor phase acts to satisfy the negative charge on the phyllosilicate thereby stabilizing the delaminated product as well as facilitating the delamination. That application further discloses, but does not claim, that exchanging a metal ion, particularly a transition metal ion, with ions from the phyllosilicate, either prior to, or during, the novel delaminating procedure, may result in the particles formed by delamination being metal coated.

INTRODUCTION

This invention is concerned with delaminated, metal coated phyllosilicates, and with methods for their production. Phyllosilicates are also known as hydrated sheet, or lattice layered, silicates.

The invention comprehends the entire genus of hydrated, or hydratable, phyllosilicates. It is especially concerned with the three layer micas, whether of natural or synthetic origin, although not so limited. These silicate minerals include vermiculite, beidellite, nontronite, volchonskoite, saponite, stevensite, sauconite, pimelite, bentonite, montmorillonite, hectorite, the smectites, attapulgite, sepiolite, phlogopite, and biopyribole. The most widely known and extensively studied of these minerals, vermiculite, is of particular interest.

The silicate layer units in these minerals have a thickness of about 10 Angstrom (Å) units, with the main elemental constituents being Mg, Al, Si, and O. These layers are separated by an interlayer composed of water molecules associated with cations, such as $Mg^{++}$, $Ca^{++}$, $Na^+$, $K^+$, and $H^+$. Before utilizing these minerals, it is frequently desirable to delaminate the particles, that is, separate the crystals at the interlayer to form high aspect ratio platelets.

It is conventional practice to delaminate the layered silicates by heating to an elevated temperature. This causes the water-containing interlayer to expand and pop open. It has also been proposed to expand vermiculite particles by refluxing in an aqueous solution of a salt such as lithium chloride. Subsequent application of a shearing force causes the crystals to separate at the interlayer and form an aqueous gel.

My U.S. Pat. No. 4,676,929 describes a method of delamination wherein a hydrated phyllosilicate is dispersed in an expanding agent, which may be a primary aminocarboxy acid, or lysine orotate, or glycylglycine. When accompanied by a shearing force, the expanding agent is effective, at ambient temperature, to separate the silicate layer units of the phyllosilicate crystal in a matter of minutes, and form a gel.

My pending application, Ser. No. 861,939 now U.S. Pat. No. 4,715,987 filed May 12, 1986, describes a modification of the procedure in U.S. Pat. No. 4,676,929. There, a phyllosilicate is exposed to a source of exchangeable cations to effect a change in the chemical makeup of the phyllosilicate interlayer before being reacted with an expanding agent to delaminate the phyllosilicate and form a gel. It is further taught that the cations introduced by exchange tend to neutralize a negative charge on the phyllosilicate, and thereby stabilize a flocculated product which may be formed as a sheet, film, or fiber.

RELATED LITERATURE

In addition to the patent and applications thus far described, attention is directed to the following United States Patents:

U.S. Pat. No. 3,490,887 (Herczog et al.) discloses outward migration of copper ions in a ferroelectric glass-ceramic by a controlled heat treatment. The copper ions oxidize at the surface to form an oxide layer that can be reduced to metallic copper by firing in hydrogen.

U.S. Pat. No. 3,420,645 (Hair) discloses a method of making hollow glass articles from particles of aluminosilicate glass containing copper oxide by heating the particles in hydrogen at 600°–1000° C. to cause copper ion migration, formation of a copper film on the surface, and expansion of the particle to form a hollow body.

PURPOSES OF THE INVENTION

The basic purpose of the invention is to provide a delaminated phyllosilicate wherein the delaminated platelets have a metallic coating on their surface.

A further purpose is to provide a ceramic-metal composite with co-continuous phases.

Another purpose is to provide a ceramic-metal composite having useful electronic, magnetic, and/or ionic conductivity properties.

A still further purpose is to provide a ceramic-metal composite having useful catalytic properties.

It is also a purpose to provide novel methods of forming a metal coating on delaminated phyllosilicate particles.

SUMMARY OF THE INVENTION

The invention resides in part in delaminated particles less than 1000 Å in thickness and having a metal coating on their surfaces, the metal being selected from the transition elements and metals of groups 3a, 4a, 5a and 6a of the Periodic Table.

In another embodiment, the invention is a ceramic-metal composite composed of phyllosilicate particles coated with a metal selected from the transition elements and metals of groups 3a, 4a, 5a and 6a of the Periodic Table and compressed into a solid body having co-continuous phases, the functional aspect ratio of the compressed particles being at least 100:1.

The invention is further embodied in a method of producing metal coated phyllosilicate particles of less than 1000 Å thickness which comprises exchanging metal ions from an external source with ions from the phyllosilicate, delaminating the phyllosilicate, and subjecting the delaminated particles to a thermal treatment while exposed to a reactive, non-oxidizing vapor phase. The metal ions are of metals selected from the transition elements and metals of groups 3a, 4a, 5a and 6a of the Periodic Table. In one embodiment, the phyllosilicate is delaminated by contact with an organic expanding agent such as an amino carboxy acid. In another embodiment, the thermal treatment in a vapor phase effects the delamination.

GENERAL DESCRIPTION

For present purposes, a phyllosilicate may be delaminated by any known technique. However, since development of the metal coating requires exposure to a reactive vapor phae, I prefer to employ the vapor phase/thermal treatment described in my copending application Ser. No. 07/091,444 filed of even date herewith. Accordingly, that application, in its entirety is incorporated herein by reference.

The unique feature of this invention is the metal coating on the delaminated phyllosilicate particles. This feature is based on my discovery of a phenomenon that occurs when a selected metal ion is introduced into a phyllosilicate by ion exchange prior to, or during, delamination of the material. I have found that the selected metal ion introduced by ion exchange can form a metal coating on the delaminated particles when the ion-exchanged particles are heated in contact with a reactive, non-oxidizing vapor phase such as hydrogen.

The metal ion may be introduced into the phyllosilicate, for example, by immersing the phyllosilicate in a molten salt bath containing a salt of the metal for a suitable time. However, it is also possible, and much simpler, to stir the phyllosilicate in a solution of an ionizable salt of the metal for a period of time to effect the ion exchange. The exchange occurs between the metal ion of the salt and an ion in the phyllosilicate interlayer, e.g. $K^+$, $Na^+$, or $Mg^{++}$. For most purposes an aqueous solution is most convenient and economical to use. However, if desired, a non-aqueous solution may be employed, and may be necessary in some instances. Thus, a non-aqueous solution, such as alcohol, of aluminum chloride must be used in order to obtain an aluminum, rather than aluminum oxide, coating.

Alternatively, the ion exchange may be effected simultaneously with the delamination step. Thus, if the aminocarboxy acid technique is employed, the metal salt may be mixed in the acid solution. However, if the phyllosilicate is delaminated by the vapor phase/thermal treatment of my companion application, the metal salt may be dried, or otherwise coated, on the surface of the phyllosilicate prior to the thermal treatment in the reactive vapor phase. It appears that the ion migration occurs coincident with the delamination.

The phenomenon was first observed on metal ion exchanged phyllosilicates that were obtained by delamination in accordance with the aminocarboxy acid technique described in U.S. Pat. No. 4,676,929. The full text of that application is, therefore, incorporated by reference to the extent necessary. Briefly, a phyllosilicate is subjected to a shearing force while exposed to an expanding agent such as an aminocarboxy acid. This delaminates the phyllosilicate to form a gel.

I discovered that, when the phyllosilicate was separated, as by centrifuging, and the solids exposed to a reactive, non-oxidizing vapor phase under thermal influence, unique effects occurred. In particular, the metal originally introduced by ion exchange appeared as a continuous film or coating on the phyllosilicate surface.

The standard sequence of preparation consists of either a precursor ion-exchange treatment of the starting materials or an exchange treatment during the routine aminoacid delamination treatment. Solids are then separated by centrifuging the gels. This is followed by thermal treatment in forming gas (92% $N_2$/8% $H_2$), or other atmosphere containing a reactive vapor phase, at temperatures up to 1000° C.

Gravimetric analyses of the ion exchanged and vapor phase treated gels disclosed a general degree of improved hygroscopic stability, especially when forming gas was employed. The best stability was obtained with a tin chloride ($SnCl_2$) exchanged gel treated one hour at 800° C. in forming gas.

Surface areas of these gels were observed varying from less than one to more than 60 $M^2$/gm. Total metal content reached as high as 52.0% Sn when using tin chloride for ion-exchange and 39.9% Sb when using antimony trichloride.

XRD analyses have shown ion-exchanged phyllosilicates delaminate at much lower temperatures than would normally be the case, especially when employing $SnCl_2$, $SbCl_3$, $PbC_2H_3O_2$ and $CuCl_2$ aqueous exchanges. Metallic tin was shown present at 400° C. by both XRD and DTA analyses. Metallic antimony was also observed at 400° C. on the XRD traces and delamination was also observed to occur at 400° C. Similar results were observed with $PbC_2H_3O_2$ and $CuCl_2$ exchanged gels. Methylated gels or gels made containing both aminoacids and methanol also were shown to delaminate at lower temperatures than gels made only with amino acids.

Further study revealed that the phyllosilicate, whether ion exchanged or not, could be completely delaminated by the vapor phase/thermal treatment technique. However, when it had been ion exchanged with a selected metal ion, the metal appeared as a surface film or coating during the treatment.

The effect of the reactive vapor phase/thermal treatment is to further reduce phyllosilicate particle size. This is, as shown by XRD measurements, less than 1000 Å in thickness and with an aspect ratio of at least 20:1. Surprisingly, however, when the delaminated particles are compressed to form a solid body, such as a test bar or disc, they tend to align in layers similar to the original sheet form. Thus, measurements on such compressed composites show an apparent or functional aspect ratio of at least 100:1.

In many instances, only metals or metal oxides are revealed in an X-ray trace, even though chemical analyses have shown the metal component to be less than 20% by weight. This further verifies that the phyllosilicate particles are less than 1000 Å in cross-section.

Specific Description

EXAMPLE 1

A quantity of -270 mesh vermiculite from North Carolina was stirred in a 1M aqueous solution of copper chloride ($CuCl_2$) at room temperature to exchange copper ions with ions from the interlayer of the vermiculite. The amount of vermiculite was sufficient to provide about 10% solids. The ion-exchanged vermiculite was separated and washed thoroughly with distilled water. It was then dried at 150° C. overnight.

The ion-exchanged vermiculite was then placed in a blender with 100 ml. of a 3M aqueous solution of glycine and subjected to a mild shearing force for a few minutes. This delaminated the vermiculite and formed a gel. The gel was then separated by centrifuging and washed twice with distilled water. The separated vermiculite was then dried overnight in a vacuum oven at 170° C.

The dried vermiculite was partitioned to provide eight samples. Four of these were heated in air, each at a different temperature. The remaining four were heated in a forming gas atmosphere, each at a temperature corresponding to that used for an air treated sample. The heat treating temperatures were 200° C., 400° C., 600° C., and 800° C., and treatment time in each instance was one hour.

Prior to ion exchange, the vermiculite contained only traces of copper, if any. Samples were also taken of the vermiculite as ion exchanged, of the delaminated material separated form the gel, and each of the thermal/vapor phase treated samples for chemical analysis. Analyses showed 9.23% Cu and 1.53% Cl in the initial ion-exchanged sample, and 4.33% Cu and under 0.04% Cl in the gel sample.

Samples of each thermal/vapor phase treated portion were also analyzed for copper. The results were:

| Treatment | % Cu |
| --- | --- |
| 200° C./air | 4.35 |
| 200° C./$H_2$ | 4.50 |
| 400° C./air | 4.65 |
| 400° C./$H_2$ | 4.57 |
| 600° C./air | 4.84 |
| 600° C./$H_2$ | 5.14 |
| 800° C./air | 4.93 |
| 800° C./$H_2$ | 5.20 |

Each of the eight treated samples was then left exposed in air at about 40% relative humidity. Gravimetric measurements were made at 24 and 48 hour intervals to determine cumulative moisture pickup in percent by weight. The results observed are shown below:

| Time (hrs.) | Atmosphere | Treatment Temperature (°C.) | | | |
| --- | --- | --- | --- | --- | --- |
| | | 200 | 400 | 600 | 800 |
| 24 | air | 2.48 | 5.66 | 0.84 | 0.96 |
| 48 | air | 2.61 | 5.71 | 1.01 | 1.14 |
| 96 | air | 2.81 | 4.77 | 1.81 | 0.91 |
| 144 | air | 2.27 | 5.46 | 1.53 | 0.99 |
| 24 | $N_2/H_2$ | 2.98 | 3.17 | 0.09 | 0.20 |
| 48 | $N_2/H_2$ | 3.23 | 3.52 | 0.16 | 0.30 |
| 96 | $N_2/H_2$ | 3.46 | 3.04 | 0.46 | 0.27 |
| 144 | $N_2/H_2$ | 3.00 | 3.49 | 0.31 | 0.29 |

EXAMPLE 2

The treatment steps and observations of Example 1 were essentially repeated, except for the ion exchange solution. Here, the raw vermiculite was stirred into a 1M aqueous solution of tin chloride ($SnCl_2$).

Prior to ion exchange, the vermiculite contained only trace amounts of tin, if any. The ion exchanged material, before delamination, showed 50.1% Sn and 7.81% Cl. After delamination, and before heat treatment, the values were 52.0% Sn and 1.07 Cl.

Analyses for tin in the heat treated samples gave these values:

| Treatment | % Sn |
| --- | --- |
| 200° C./air | 36.0 |
| 200° C./$H_2$ | 37.2 |
| 400° C./air | 25.9 |
| 400° C./$H_2$ | 39.3 |
| 600° C./air | 16.8 |
| 600° C./$H_2$ | 47.7 |
| 800° C./air | 43.9 |
| 800° C./$H_2$ | 7.1 |

Moisture pickup in percent by weight was observed as follows:

| Time (hrs.) | Atmosphere | Treatment Temperature (°C.) | | | |
| --- | --- | --- | --- | --- | --- |
| | | 200 | 400 | 600 | 800 |
| 24 | air | 4.02 | 4.73 | 1.72 | 1.56 |
| 48 | air | 4.02 | 4.71 | 1.97 | 1.75 |
| 96 | air | 4.26 | 3.89 | 2.76 | 1.53 |
| 144 | air | 3.18 | 4.47 | 2.43 | 1.62 |
| 24 | $N_2/H_2$ | 5.10 | 0.90 | 0.47 | 0.01 |
| 48 | $N_2/H_2$ | 5.53 | 1.42 | 0.48 | 0.02 |
| 96 | $N_2/H_2$ | 6.43 | 1.31 | 0.52 | 0.02 |
| 144 | $N_2/H_2$ | 5.76 | 1.52 | 0.51 | 0.02 |

EXAMPLE 3

The treatment steps and observations of Examples 1 and 2 were repeated, except that the vermiculite was stirred into a 1M aqueous solution of magnesium chloride ($MgCl_2$). Gravimetric analysis showed that the vermiculite, as received, contained 13.5% by weight Mg, while, after the treatment in $MgCl_2$, the value noted was 13.8%. This indicates no significant ion exchange taking place.

EXAMPLE 4

A quantity of −170 mesh vermiculite was stirred into an aqueous solution of 3M glycine and 1M antimony chloride ($SbCl_3$) together with an addition of methanol. The mixture was subjected to a shear force in a blender for a few minutes to form a gel. The gel was then separated by centrifuging, and the solid portion washed in distilled water.

After drying overnight, the vermiculite was divided into eight portions and each given a separate vapor phase/thermal treatment as in previous examples. Gravimetric measurements, made as before, showed essentially no antimony in the raw vermiculite, but approximately 38% by weight in the delaminated material.

Analyses of the eight heat treated samples for percent by weight antimony are shown below:

| Treatment | % Sb |
| --- | --- |
| 200° C./air | 37.7 |
| 200° C./$H_2$ | 39.9 |
| 400° C./air | 10.8 |
| 400° C./$H_2$ | 12.8 |
| 600° C./air | 3.8 |
| 600° C./$H_2$ | 7.4 |
| 800° C./air | 0.6 |
| 800° C./$H_2$ | 22.3 |

Cumulative moisture pickup values, as observed on each heat treated sample when exposed to 40% relative humidity, are shown in the following table:

| Treatment | Wt. % $H_2O$ |
| --- | --- |
| 200° C./air | 2.54 |
| 200° C./$H_2$ | 2.73 |
| 400° C./air | 2.11 |
| 400° C./$H_2$ | 2.82 |
| 600° C./air | 2.40 |
| 600° C./$H_2$ | 0.37 |
| 800° C./air | 0.55 |
| 800° C./$H_2$ | 0.11 |

EXAMPLE 5

A quantity of 270 mesh vermiculite was stirred into a 1M aqueous solution of tin chloride ($SnCl_2$) at room temperature to exchange tin ions with ions from the interlayer of the vermiculite. The amount of vermiculite was such as to provide about 10% solids in the mixture. The ion-exchanged vermiculite was separated and washed thoroughly with distilled water. It was then dried overnight at 150° C.

The dry, ion-exchanged vermiculite was then divided into two portions. Both portions were thermally treated in a forming gas atmosphere for one hour. One portion was treated at a temperature of 400° C.; the other at a temperature of 800° C.

X-ray diffraction (XRD) studies were performed on samples from both of the treated vermiculite portions. The table below lists several characteristic peaks that signify Sn, $SnO_2$ and vermiculite on an XRD trace. Also listed are the peaks and their relative intensities, as actually observed on the 400° C. and the 800° C. treated samples, both in a forming gas atmosphere.

TABLE

| JCPDS Characteristic Peaks (Å) | Observed Peaks 400° C. | | Observed Peaks 800° C. | |
|---|---|---|---|---|
| | Peak(Å) | Intensity(%) | Peak(Å) | Intensity(%) |
| Sn | | | | |
| 3.75 | — | — | — | — |
| 2.92 | 2.918 | 92 | 2.894 | 92 |
| 2.79 | 2.794 | 100 | 2.772 | 100 |
| 2.29 | — | — | — | — |
| 2.02 | 2.018 | 100 | 2.052 | 45 |
| 1.96 | — | — | 2.007 | 90 |
| $SnO_2$ | | | | |
| 3.35 | 3.340 | 29 | — | — |
| 2.64 | 2.647 | 19 | — | — |
| 1.77 | 1.768 | 3 | 1.776 | <1 |
| Vermiculite | | | | |
| 14.20 | 14.050 | 5 | — | — |
| 4.57 | 4.610 | 5 | — | — |

The strong Sn peaks demonstrate a well ordered Sn coating at both temperatures. The $SnO_2$ peaks indicate a minor amount of the oxide at 400° C., and virtually none at 800° C.

The absence of the low angle values for vermiculite treated at 800° C., indicates that delamination of the vermiculite to less than 100 Å has occurred. Higher angle values are still present of course.

EXAMPLE 6

A quantity of vermiculite was stirred in a 1M solution of copper chloride ($CuCl_2$) in 1M HCl at room temperature to exchange copper ions with ions from the interlayer of the vermiculite. The vermiculite constituted about 10% solids in the mixture. These solids were separated, thoroughly washed with distilled water and dried at 150° C.

The dry, ion-exchanged vermiculite was then divided into two portions as in Example 5. Both portions were thermally treated in a forming gas atmosphere for one hour. The treating temperature was 400° C. for one portion and 600° C. for the other.

X-ray diffraction (XRD) studies were performed on both samples as in Example 5. Characteristic peaks for Cu, $Cu_2O$ and vermiculite are listed below, together with actually observed values for each treated sample.

TABLE

| JCPDS Characteristic Peaks (Å) | Observed Peaks 400° C. | | Observed Peaks 800° C. | |
|---|---|---|---|---|
| | Peak(Å) | Intensity(%) | Peak(Å) | Intensity(%) |
| Cu | | | | |
| 2.09 | 2.096 | 100 | 2.091 | 100 |
| 1.81 | 1.814 | 47 | 1.811 | 42 |
| 1.28 | — | — | — | — |
| $Cu_2O$ | | | | |
| 2.47 | 2.484 | 2 | 2.469 | 18 |
| 2.14 | — | — | 2.140 | 4 |
| 1.51 | 1.543 | 4 | 1.512 | 5 |
| Vermiculite | | | | |
| 14.20 | — | — | — | — |
| 4.57 | 4.640 | 2 | — | — |

The strong Cu peaks demonstrate a well ordered copper coating at both temperatures. The $Cu_2O$ peaks indicate a very minor presence of the oxide. The virtual absence of the low angle values for vermiculite again indicates delamination to less than about 100 Å.

EXAMPLE 7

A mixture was prepared by stirring sepiolite into a solution of 0.0013 grams silver chloride (AgCl) in 200 ml. $NH_4OH$ at room temperature. Following the exchange of silver ions for ions from the sepiolite interlayer, the solids (about 10%) were separated, thoroughly washed and dried.

The dry, ion-exchanged sepiolite was then thermally treated at 800° C. in a forming gas atmosphere. XRD studies were carried out on the treated sepiolite. Characteristic peaks for Ag are listed as in Examples 5 and 6, together with observed data that denote development of a silver coating.

TABLE

| JCPDS Characteristic Peaks(Å) | Observed Peaks | |
|---|---|---|
| Ag | Peak(Å) | Intensity |
| 2.36 | 2.367 | 100 |
| 2.04 | 2.051 | 44 |
| 1.44 | 1.448 | 29 |
| 1.23 | — | — |
| 1.18 | — | — |

It may be noted, relative to all examples, that the XRD observed peaks did not extend beyond about 1.40 Å due to the particular apparatus employed.

I claim:

1. A delaminated phyllosilicate particle less than 1000 Å in thickness and characterized by a metal coating over its surface, the metal being selected from the transition elements and metals of groups 3a, 4a, 5a and 6a of the Periodic Table.

2. A phyllosilicate particle in accordance with claim 1 wherein the phyllosilicate is vermiculite.

3. A phyllosilicate particle in accordance with claim 1 wherein the metal is selected from the transition elements.

4. A phyllosilicate particle in accordance with claim 1 wherein the metal is selected from the group composed of tin, antimony, copper, and lead.

5. A phyllosilicate particle in accordance with claim 1 wherein the selected metal is a noble metal.

6. A ceramic-metal composite composed of metal coated phyllosilicate particles less than 1000 Å in thickness, the particles being consolidated into a body having co-continuous phases and an apparent aspect ratio for the phyllosilicate of at least 100:1, the metal being selected from the transition elements and metals of groups 3a, 4a, 5a, and 6a of the Periodic Table.

7. A composite in accordance with claim 6 wherein the phyllosilicate is vermiculite.

8. A composite in accordance with claim 6 wherein the phyllosilicate is sepiolite.

9. A composite in accordance with claim 6 wherein the metal is selected from the transition elements.

10. A composite in accordance with claim 6 wherein the metal is copper, tin, antimony, or lead.

11. A method of producing a metal coated phyllosilicate particle which comprises exchanging metal ions from an external source with ions from the phyllosilicate, delaminating the phyllosilicate to form particles and subjecting the particles to a thermal treatment while exposed to a reactive, non-oxidizing vapor phase, the metal being selected from the transition elements and metals of groups 3a, 4a, 5a and 6a of the Periodic Table.

12. A method in accordance with claim 11 wherein the metal ions from an external source are transition metal ions.

13. A method in accordance with claim 11 wherein the delaminated platelets are less than 1000 Å in thickness.

14. A method in accordance with claim 11 wherein the phyllosilicate is vermiculite.

15. A method in accordance with claim 11 wherein the reactive vapor phase is hydrogen.

16. A method in accordance with claim 11 wherein the phyllosilicate is delaminated by contact with an organic expanding agent.

17. A method in accordance with claim 16 wherein the organic expanding agent is an aminocarboxy acid.

18. A method in accordance with claim 11 wherein the phyllosilicate is delaminated during the vapor phase/thermal treatment.

* * * * *